April 19, 1938. E. A. BAUMBACH 2,114,276
BROACHING APPARATUS
Filed Nov. 2, 1935 3 Sheets-Sheet 1

Inventor:
Emil A. Baumbach
By Jones, Addington, Ames & Seibold
Attys

April 19, 1938.  E. A. BAUMBACH  2,114,276
BROACHING APPARATUS
Filed Nov. 2, 1935  3 Sheets-Sheet 2

Inventor
Emil A. Baumbach

April 19, 1938.   E. A. BAUMBACH   2,114,276
BROACHING APPARATUS
Filed Nov. 2, 1935   3 Sheets-Sheet 3
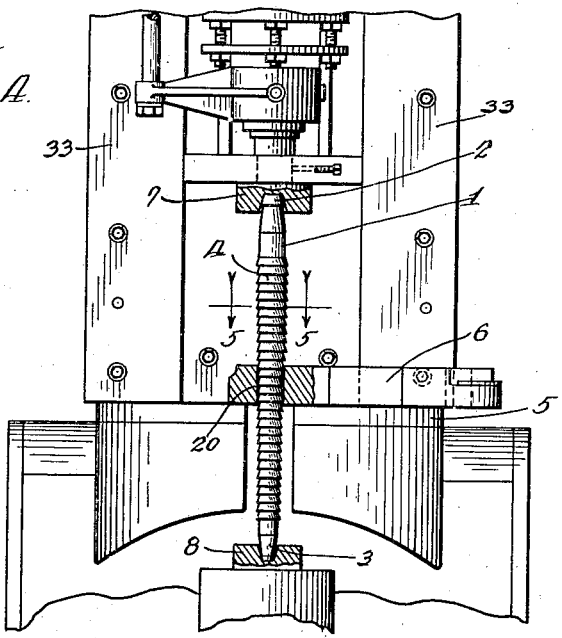
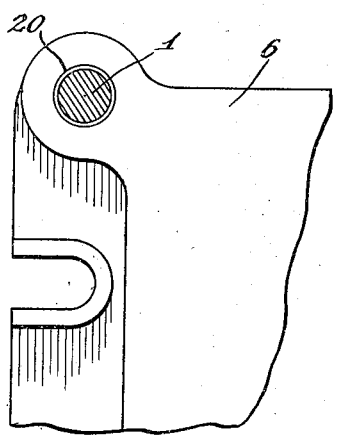
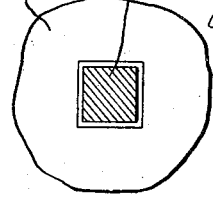
Inventor
Emil A. Baumbach
By Jones, Addington, Ames & Seibold
Attys.

Patented Apr. 19, 1938

2,114,276

UNITED STATES PATENT OFFICE 2,114,276

BROACHING APPARATUS

Emil A. Baumbach, Chicago, Ill.

Application November 2, 1935, Serial No. 47,936

4 Claims. (Cl. 90—33)

My invention relates to broaching apparatus.

One of the objects of my invention is to provide improved broaching apparatus which will insure greater accuracy in the broaching operation.

A further object is to provide an improved broaching apparatus which will prevent the broaching tool from drifting laterally, causing the axis of the hole to be slanting or off center.

A further object is to provide an improved broaching apparatus which will enable a relatively heavy cut to be made, thus lessening the number of cutting edges required and enabling the use of a shorter tool.

Further objects and advantages of the invention will appear from the description and claims.

In the drawings, in which my invention is illustrated,

Fig. 4 is a fragmentary, front, elevational view showing the broaching tool in position in the apparatus;

Fig. 5 is a section on the line 5—5 of Fig. 4; and

Fig. 6 is a sectional view similar to Fig. 5 but showing the use of the broaching tool for making a rectangular hole.

Figure 1:
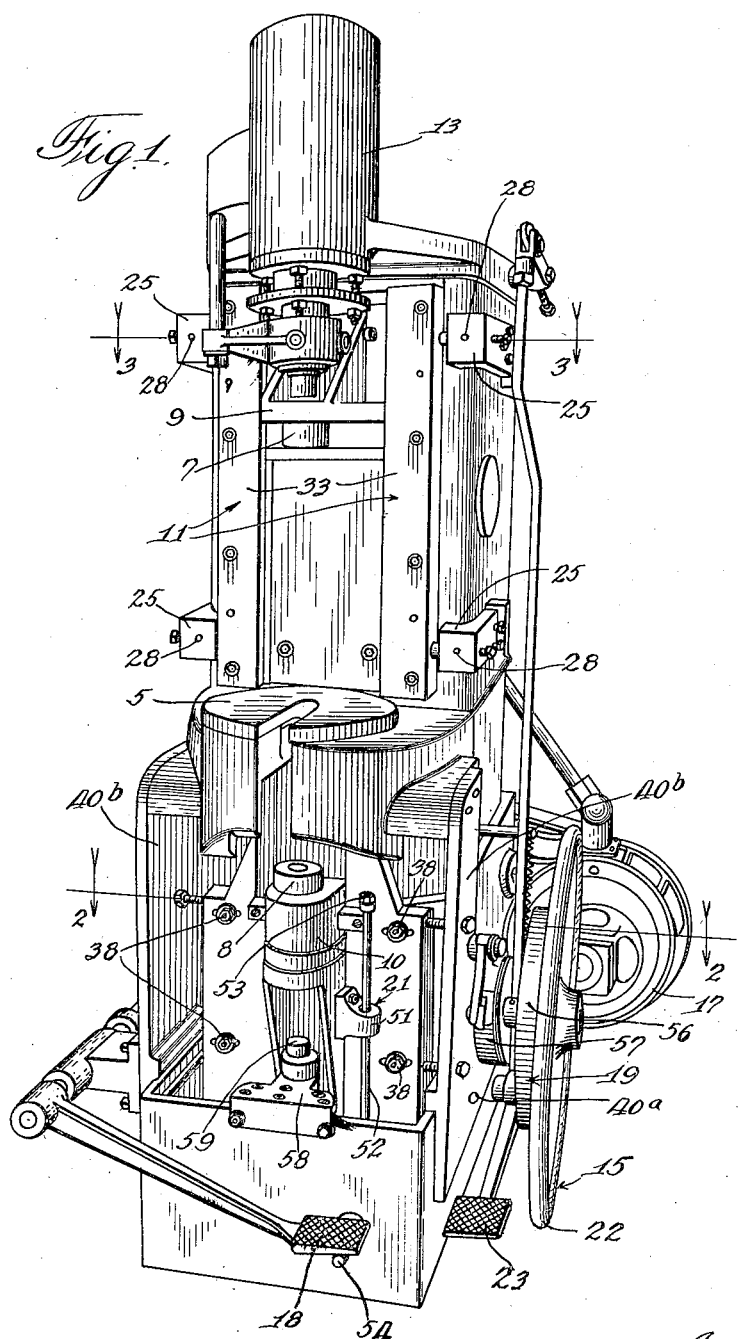
Figure 1 is a perspective view of my improved broaching apparatus.

Referring to the drawings in detail, the construction shown comprises a broaching tool 1 (Fig. 4) having upper and lower chuck-engaging portions 2 and 3 and a series of longitudinally-spaced cutter edges 4 on its intermediate portion, a work-supporting table 5 for supporting the work 6 being operated on, two aligned broach-engaging chucks 7 and 8, one above and one below the table, reciprocable longitudinally in unison to guide the broaching tool in its movement and to support both ends thereof against longitudinal movement, chuck-supporting slides 9 and 10 on which the chucks are mounted, guide means 11 and 12 for guiding the slides, power means 13 for effecting up-and-down movement of the upper chuck-supporting slide, power means 14 for effecting upward movement of the lower chuck-carrying slide to bring it into engagement with the lower end of the broach, manual means 15 for effecting the final adjustment of the lower chuck to the broach, clutch means 16 for controlling the drive from the motor 17 to the lower chuck-carrying slide 10, controlled in its clutch-engaging movement by a pedal 18 and controlled automatically in its clutch-disengaging movement by the upward movement of the lower chuck-carrying slide 10, and brake means 19 for opposing the requisite resistance to the downward movement of the lower chuck-carrying slide 10.

Before describing the construction in further detail, I will briefly outline the operation.

The guide means 11 and 12 for the chuck slides are carefully adjusted to bring them into alignment and with their axes precisely perpendicular to the plane of the work table 5. The work 6, here shown as a die shoe having a hole 20 to be broached to the proper diameter, is placed in position on the smooth work table. The broaching tool 1 is dropped into the hole 20 from above and allowed to move downwardly in the hole as far as it will go. The lower chuck slide 10 is then caused to move upwardly by pressing down on the pedal 12 to operate the clutch 16 to cause the motor 17 to move the lower clutch slide 10 upwardly. The pedal 18 is held depressed until it is lifted by the upward movement of the lower chuck slide to disconnect the clutch 16. The automatic clutch-shifting apparatus 21 is so set that it will disengage the clutch when the lower chuck is brought approximately into engagement with the lower end of the broaching tool. The final adjustment of the lower chuck 8 to the broaching tool 1 is effected by manually adjusting the hand wheel 22. The upper chuck slide 9 is then caused to move downwardly by depressing the pedal 23 to bring the upper chuck 7 into engagement with the upper end 2 of the broaching tool and then to force the broaching tool through the hole in the work. In this broaching operation, the work can thus adjust itself easily to the position of the broach by shifting to a properly centered position on the work table 5.

Figure 3:
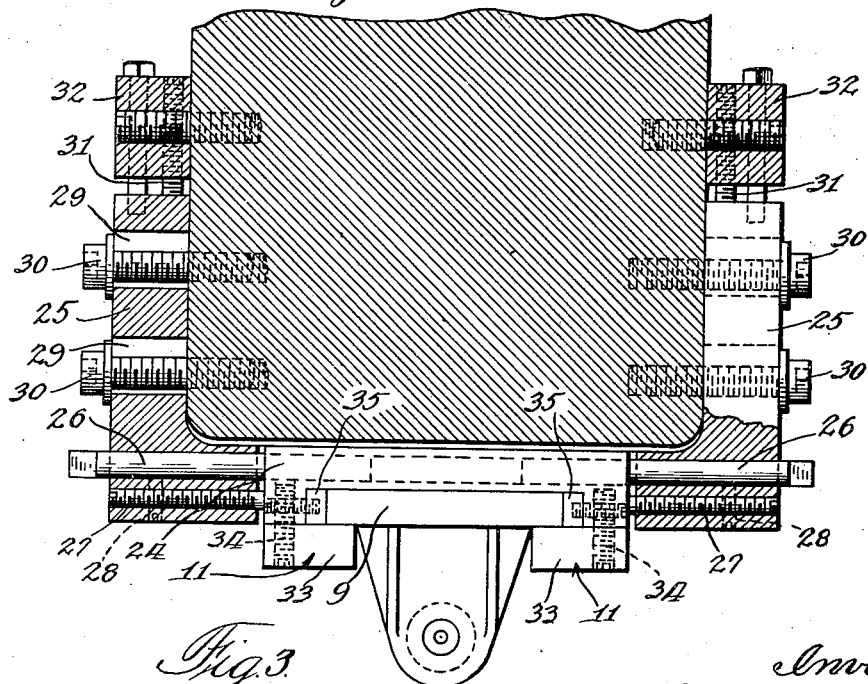
Fig. 3 is a section on the line 3—3 of Fig. 1.

Referring now more in detail to the construction, the guide means 11 for the upper chuck slide 9 is adjustable, both fore and aft, and laterally, as shown more particularly in Figs. 1 and 3. The guide construction comprises a channeled guideway 24 in which the slide 9 operates and upper and lower pairs of adjustable brackets 25 for carrying this channeled guideway. The channeled guideway is secured to the upper and lower pairs of brackets by means of studs 26 firmly secured to the guideway 24 and mounted for limited sliding movement in openings in the brackets 25. A slight lateral adjustment of the guideway may be effected by turning the adjusting screws 27 which are threaded in the brackets 25 and the ends of which engage the side edges of the guideway 24. After the guideway has been properly adjusted laterally, it is secured in this adjusted position by means of set screws 28 threaded in the brackets 25 and engaging the slidable studs 26. The fore and aft adjustment of the guideway is effected by the provision of slots 29 in the brackets 25 through which extend cap screws 30 threaded into the frame of the apparatus. Adjusting screws 31 are provided for effecting an accurate fore and aft adjustment of these brackets, mounted in lugs 32 secured to the sides of the frame and having their ends engaging the brackets. The slide 9 is held in place in the guideway by means of retaining strips 33 secured to the guideway by means of screws 34. Suitable adjustable gibs 35 are provided for taking up wear. By means of this construction, it will be seen that the guideway for the upper chuck slide may be readily and accurately adjusted both fore and aft, and laterally.

The guide means for the lower chuck slide comprise a pair of guide strips 36 engaging slide flanges 37 on the slide and secured to the frame of the machine by means of cap screws 38 extending through slots 39 in the guide strips and threaded into the frame of the apparatus. This construction enables a limited lateral adjustment of the guide strips 12 by means of the adjusting and setting screws 40 which engage the side edges of the guide strips.

Figure 2:
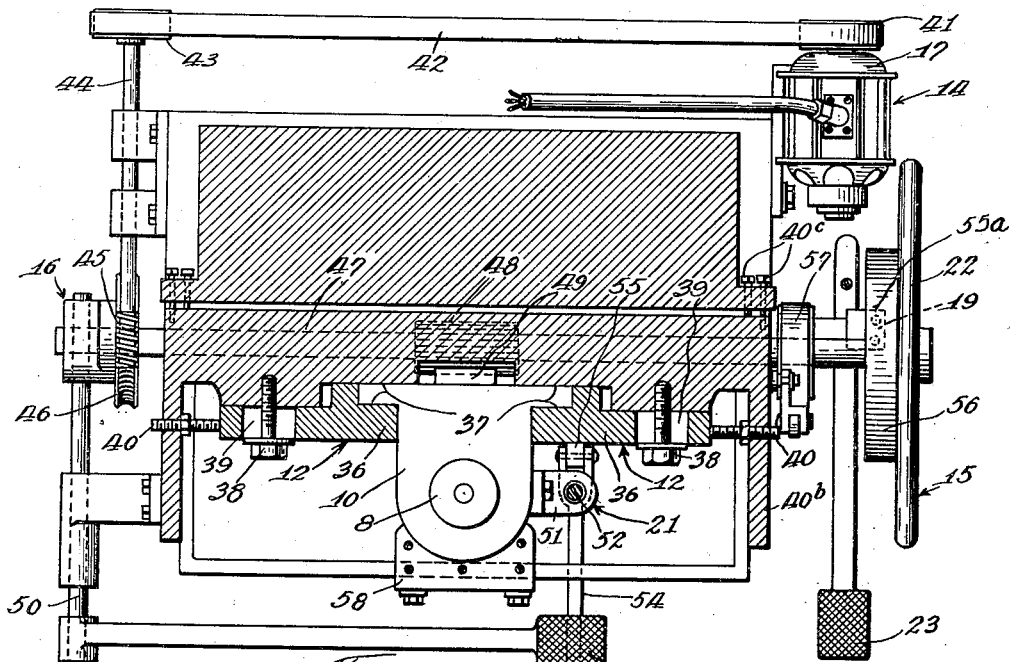
Fig. 2 is a section on the line 2—2 of Fig. 1.

The guide means are also mounted for swinging adjustment about a horizontal transverse axis at 40a (Fig. 1) adjacent the lower end of a swinging frame 40b which carries the guide strips 12. This swinging frame may be adjusted and held in adjusted position by means of two pairs of screws 40c (Fig. 2), one pair on each side of the main frame, one of each pair of screws being swiveled in the main frame and threaded in the swinging frame, and the other screw of each pair being threaded in the main frame and having its point bearing on the swinging frame. By proper adjustment and setting of these screws 40c, the swinging frame 40b may be brought into a position in which the line of movement of the lower chuck 8 will be exactly perpendicular to the plane of the table 5.

The transmission from the motor 17 to the lower chuck slide 10 comprises a pulley 41 on the motor shaft, a belt 42 running over this pulley, a pulley 43 driven by this belt, a shaft 44 on which this pulley is mounted, a worm 45 on this shaft, a worm wheel 46 driven by the worm 45, the clutch 16 for controlling the driving connection between the worm wheel 46 and cross shaft 47, and a pinion 48 on this cross shaft meshing with a rack 49 on the chuck slide 10. The clutch 16 is moved into clutching engagement by depressing the pedal 18 mounted on the rock shaft 50 which controls the clutch-shifting movement. The mechanism 21 for effecting the automatic disengagement of the clutch 16 comprises a lug 51 secured to the side of the chuck slide 10, an upright rod 52 loosely and slidably mounted in an opening through this lug 51 and having an adjustable abutment 53 on its upper end engaged by the lifting lug 51 as the chuck slide 10 moves upwardly, and a pedal-lifting lever 54 pivotally mounted at 55 and having its forward end extending through an opening in the framework underneath the pedal 16. The lifter rod 52 is connected with the pedal-lifting lever 54 in such manner that when the lug 51 on the chuck slide 10 lifts the rod, the rod will cause the outer end of the pedal-lifting lever 54 to move upwardly to effect the disengagement of the clutch. The abutment 53 on the upper end of the lifter rod is adjustable so that the clutch will be automatically disconnected at the desired position.

After the clutch has been automatically disconnected with the lower chuck slide 10 in approximately the desired position, the final adjustment of the chuck slide may be made by the hand wheel 22 which is mounted on the cross shaft 47 on which the rack actuating pinion is mounted.

The brake means 19 for opposing requisite resistance to the downward movement of the lower chuck-carrying slide may be of any suitable construction, such as a brake shoe 55a engageable with a brake lining inside the brake drum 56 which is rotatable with the shaft 47. The brake shoe 55a is connected with the pedal 23 which controls the upper chuck slide. When the operator has pressed down on this pedal to start the downward movement of the upper chuck slide, he can impose any resistance he desires to the downward movement of the lower chuck slide 10 by exerting more or less pressure on the pedal 23. In addition to this foot-controlled shoe brake, an additional one-way brake 57 may be provided which will oppose resistance to the downward movement of the lower chuck slide but will not interfere with its upward movement. The purpose of this brake is mainly to hold the lower chuck slide in the position to which it may have been adjusted to prevent it from moving downwardly under its own weight.

In order to limit the extreme downward movement of the lower chuck slide, a knee or abutment 58 is provided, secured to the main frame of the machine and having a stop portion 59 located in the path of movement of the chuck slide to stop it in its extreme lower position.

In the broaching operation, it will be seen that the broaching tool 1 is supported at both ends so that it cannot drift laterally to cause the axis of the hole to be slanting or off center. Because of the fact that the broaching tool is supported at both ends, a relatively heavy cut may be made, thus lessening the number of cutting edges required and enabling the use of a short tool.

Further modifications will be apparent to those skilled in the art and it is desired, therefore, that the invention be limited only by the prior art and the scope of the appended claims.

Having thus described my invention, what I claim and desire to secure by Letters Patent is:

1. Push broaching apparatus comprising a work-supporting table, two aligned tool-engaging chucks on opposite sides of said table, power means for actuating one of said chucks to push the tool through the work to effect the broaching operation and causing the tool in its movement to push the other chuck ahead of it, the chuck being pushed having provisions for yieldingly resisting the pushing action of the tool to maintain this chuck in contact with the tool throughout the work stroke, manually controlled means for moving the resisting chuck toward the driving chuck to bring the end of the tool adjacent the driving chuck, and means for stopping the movement of said resisting chuck when the end of the tool is adjacent the driving chuck.

2. Push broaching apparatus comprising a work-supporting table, two aligned tool-engaging chucks on opposite sides of said table, power means for actuating one of said chucks to push the tool through the work to effect the broaching operation and causing the tool in its movement to push the other chuck ahead of it, the chuck being pushed having provisions for yieldingly resisting the pushing action of the tool to maintain this chuck in contact with the tool throughout the work stroke, manually operable means for moving the resisting chuck toward the driving chuck to bring the end of the tool adjacent the driving chuck, means for stopping the movement of said resisting chuck when the end of the tool is adjacent the driving chuck, and manually operable means for moving the resisting chuck toward the driving chuck to effect the final adjustment of the tool to the driving chuck.

3. Push broaching apparatus comprising a work-supporting table, two aligned tool-engaging chucks on opposite sides of the table, power means for moving one of said chucks toward said table throughout the working stroke to push the tool through the work to effect the broaching operation, means for moving said other chuck toward the table to effect chucking engagement with the tool prior to the working stroke, and yielding means for resisting throughout the working stroke the movement away from the table of said other chuck to maintain said other chuck in engagement with the tool throughout the working stroke, said power means having power sufficient to overcome said yielding resistance throughout the working stroke.

4. Push broaching apparatus comprising a work-supporting table, two aligned tool-engaging chucks on opposite sides of the table, power means for moving one of said chucks toward said table throughout the working stroke to push the tool through the work to effect the broaching operation, means for moving said other chuck toward the table to effect chucking engagement with the tool prior to the working stroke, and yielding means for resisting throughout the working stroke the movement away from the table of said other chuck to maintain said other chuck in engagement with the tool throughout the working stroke, said power means having power sufficient to overcome said yielding resistance throughout the working stroke, said yielding means comprising a brake drum driven from said other chuck and a brake shoe cooperating with said drum.

EMIL A. BAUMBACH.